3,475,365
POLYAMIDE MOLDING COMPOSITION
Bernard Silverman, Raleigh, N.C., assignor to Monsanto Company, St. Louis, Mo., a corporation of Delaware
No Drawing. Filed May 19, 1967, Ser. No. 639,621
Int. Cl. C08g 51/44, 41/02, 53/14
U.S. Cl. 260—32.6          3 Claims

ABSTRACT OF THE DISCLOSURE

The bulk density of polyhexamethylene adipamide molding resin is increased significantly by coating the resin with 0.005 to 0.2 weight percent of ethylenebispelargonamide and results in a molding composition with greatly improved processing and product properties.

BACKGROUND OF THE INVENTION

Field of the invention

The thermoplastic resins with which this invention is concerned are super polycarbonamides of the nylon type and which are particularly suitable as molding compositions. These may be derived from the polycondensation of diacid chlorides and diamines, diacids and diamines or by self-condensation of appropriate amino acids or lactams. Typical examples of such super poly-amides are polyhexamethylene adipamide, polyhexamethylene sebacamide and poly-ε-caprolactam.

Description of the prior art

In the past, thermoplastic polyamide resins have been treated to improve their molding properties by incorporating plasticizer or by coating the particle surface with a lubricant. While the use of plasticizers is suitable for many commercial molding applications, it suffers from the disadvantage that the fluid flow properties of the composition are altered and relatively large quantities of plasticizers are needed yet they do not impart lubricity to the substrate. Similarly, it has been known to coat thermoplastic polyamide molding resins with certain materials to improve their lubricity, for example, as disclosed in U.S. Patent 2,770,609 and U.S. Patent 2,948,698. However, these molding compositions are not entirely satisfactory since the coating materials heretofore employed are relatively thermally unstable and low melting, and often result in "silver streaking" in the product and excessive nozzle drool commercial practice.

SUMMARY OF THE INVENTION

In accordance with the present invention there is provided polyamide molding particles suitable for injection molding, wherein the polyamide contains recurring carbonamide linkages as an integral part of the polymer chain, said particles being coated with 0.005% to 0.2%, based on the weight of the polyamide, of ethylenebispelargonamide.

The polyamides useful in the present invention are those which have recurring carbonamide linkage as an integral part of the polymer chain and are prepared by polymerizing reactants comprising substantially equimolar proportions of a dicarboxylic acid of the formula

HOOC—R—COOH wherein R is a divalent hydrocarbon radical having two to twenty carbon atoms and a diamine of the formula

NH$_2$—R'—NH$_2$ wherein R' is also a divalent hydrocarbon radical having two to twenty carbon atoms.

Illustrative of compounds included in the above general diacid formula are glutaric acid, adipic acid, pimelic acid, sebacic acid, azelaic acid, 1,20-eicosane dioic acid, and the like. Compounds included in the general diamine formula are hexamethylene diamine, pentamethylene diamine, ethylene diamine, octamethylene diamine, tetramethylene diamine and the like. The polymerization results in a high molecular weight polyamide having the following general formula

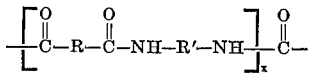

wherein R and R' are as defined above and x is such that the polymer has a molecular weight that will give an intrinsic viscosity, [η], of 0.4 or greater where

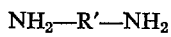

in which $\eta_{Rel.}$ is the relative viscosity of a dilute solution of the polymer in 90% formic acid at a temperature of 25° C. and C is the concentration in grams per 100 cubic centimeters of solvent. The coated polymers thus obtained have high melting points and can be injection molded into useful shaped objects.

The polymer may be prepared in any manner suitable for molding compositions and is not critical. The individual reactants are reacted together or, preferably, the preformed salt is polymerized from an aqueous solution. For example, an aqueous solution of hexamethylene diammonium adipate of about 50% solids is evaporated to about 75% solids under about 13 p.s.i.g. of autogenous pressure. The heated mass is transferred to a sealed autoclave equipped with a stirrer and heated until the pressure reaches about 250 p.s.i.g. At this point the evaporation and polymerization is continued by bleeding the steam at such a rate as to maintain the pressure at about 250 p.s.i.g. while heating and stirring are continued. As the rate of distillate declines the polymer temperature rises to about 250° C. and the pressure is reduced in a programmed manner over about a 30-minute period until the polymer reaches atmospheric pressure. The system is then vented while under atmospheric pressure and stirring and heating are continued for 30 minutes so as to maintain the melt temperature at about 275° C. and to increase the molecular weight of the polymer. The system is then pressurized with inert gas and extruded from the autoclave to permit casting, quenching and cutting of the polymer for later use in molding work.

In accordance with this invention it has been discovered that polyamide particles coated with ethylenebispelargonamide exhibit a significantly greater bulk density than similar higher bisamides and, more surprisingly, exhibit far greater thermal stability resulting in much better processing properties. This discovery is surprising inasmuch as it has been generally believed that the bisamides of higher acids would give better results. Note, U.S. Patent 2,948,698.

The amounts of ethylenebispelargonamide used to coat the polyamide resins in accordance with this invention are in the range of 0.005 to 0.2 weight percent based on the polyamide. It has been found that amounts less than 0.005% do not give significant improvement in bulk density. Amounts greater than 0.2% are not practical since the improvement, if any, of greater amounts is not sufficient to warrant the extra coating material. The preferred amount is 0.01 to 0.05 weight percent.

It is generally accepted that the bulk density is the most important parameter of a molding composition useful for injection molding and the higher the bulk density the better the composition, because it results in more uniform hopper feed and lower cylinder pressures. In addition, the injection cycle time can be reduced since a higher bulk density permits the flow of higher masses per unit time and results in higher production efficiency. While this is true, there are two other factors that are usually not considered, but are important to, and contribute significantly to the value of a given molding composition. The two parameters that greatly affect the efficiency of the molded product and the molding process are (1) the thermal stability of the lubricant and (2) the melting point of the lubricant. High thermal stability of the lubricant is very important because it will not lower the quality of the molded product physically or chemically during or after processing. For example, a lubricant should be selected which does not suffer decomposition as it approaches the cylinder temperature. In actual practice, such decomposition is manifested by gas evolution and/or discoloration of the lubricant in the molded product, resulting in a high reject rate. To illustrate clearly the relative thermal stability of the lubricant of this invention, i.e. ethylenebispelargonamide, in relation to conventional lubricants, a table is shown below which indicates the course of decomposition of conventional molding lubricants as a function of increasing temperatures while ethylenebispelargonamide remains stable.

TABLE I.—THERMAL STABILITY OF MOLDING LUBRICANTS

| Temp. (° F.) | Ethylene-bispelargonamide | Ethylene-bisstearamide | Methylene bisstearamide |
|---|---|---|---|
| 356 | No decomposition | No decomposition | No decomposition. |
| 392 | Colorless | Light yellow | Yellow. |
| 482 | do | do | Do. |
| 572 | Colorless, no evidence of decomposition. | Light yellow, gas evolution indicative of decomposition. | Light yellow, gas evolution indicative of decomposition. |

The above data clearly demonstrate the superior thermal stability of ethylenebispelargonamide, not only by the absence of gas evolution but also by the lack of color change, over conventional molding lubricants up to about the upper limit of the useable temperature range for polyamide molding compositions.

As mentioned previously, the melting point of a lubricant is also important in order to permit a low and uniform pressure drop along the barrel of the injection cylinder used for injecting the molten polymer composition into the mold. Higher pressure drops are caused by the melting of the lubricant at lower temperatures causing a subsequent difference in interparticle friction between the resin coated with solid lubricant and the resin coated with molten lubricant. This results in erratic mold filling times and/or abnormally high power requirements to fill the mold. The following tables, II and III, show (II) the melting point difference between the molding lubricant, ethylenebispelargonamide, of this invention and those of conventional practice and (III) the effect of a higher melting point on production efficiency as indicated by the length of a spiral mold filled in an injection molding machine.

TABLE II.—MELTING POINTS OF MOLDING LUBRICANTS

Lubricant: M.P. (° F.)
    Ethylenebispelargonamide _____ 327–329
    Ethylenebisstearamide _____ 286–288
    Methylenebisstearamide _____ 291–293

From the above data it can be seen that the melting point of ethylenebispelargonamide is about 40° F. higher than lubricants used in conventional practice.

Table III illustrates the effect of a lubricant melting point on production efficiency as a function of the extent to which a spiral mold is filled in actual practice. For this test a spiral die was mounted in a 4-oz. Impco I Injection Molding Machine. Specimens were molded at a nozzle temperature of 520° F., center temperature of 550° F. to 560° F. with a 12-second injection cycle, 28-second closed die, 5-second and 6-second booster cycle. Line pressure was 1100 p.s.i. and final mold temperature was 140° F. Before running the test samples, 16 blank samples were made to bring the equipment to equilibrium molding conditions.

TABLE III.—SPIRAL MOLD FILL

Sample: Mold fill (cm.)
    Polyamide resin (control) _____ 55.0
    Polyamide resin+methylenebisstearamide ____ 76.0
    Polyamide resin+ethylenebispelargonamide __ 81.4

Again the outstanding performance of ethylenebispelargonamide is clearly illustrated by the greatest mold fill.

Besides the unexpected discovery that polyamide resins coated with ethylenebispelargonamide exhibit superior thermal stability and superior mold filling ability, it has surprisingly been found that the bulk density of such resins is improved as illustrated in the following examples.

DESCRIPTION OF THE PREFERRED EMBODIMENTS

In order to illustrate the invention and its advantages, the following specific examples are given. It should be understood that they are intended to be illustrative and not limitative. Parts are given by weight unless otherwise specified.

Bulk density is defined as the weight of resin per unit volume, when a container of known volume is filled under reproducible, specified conditions. In the following examples, bulk density is determined by the following procedure:

(1) A 24/40, standard taper, 60° Pyrex glass funnel is mounted in a ring stand such that the bottom of the funnel is 11.8 cm. above a glass container of known volume and weight. The approximate volume of the container should be about 60% of the volume of the funnel.

(2) The funnel stem is stoppered and the funnel is filled with the molding composition to be tested.

(3) The funnel stem is unstoppered quickly to allow the resin to fill and overflow the container.

(4) The resin in the container is levelled by passing a spatula across the upper edge to remove excess resin.

(5) The container, filled with resin, is weighed and recorded.

(6) Steps two through five are repeated to give ten determinations.

The average weight is then used to make the calculation according to the following definition:

Bulk density =

$$\frac{\text{wt. of container} + \text{resin(g.)} - \text{wt. of container(g.)}}{\text{vol. of container(ml.)}}$$

EXAMPLE I

One thousand parts of polyhexamethylene adipamide, $[\eta] = 1.3$, was blended with 0.1 part of ethylenebispelargonamide (0.01 weight percent). This mixture was tumbled continuously in a suitable container for about two hours. Similarly, the same resin was treated with the same weight percent of methylenebisstearamide and of ethylenebisstearamide and both of these samples were tumbled for about two hours. In addition, a resin sample without lubricant was tumbled for about two hours in the same manner. The last three samples were prepared to serve as controls to be compared to the molding composition of this invention. After the samples were prepared a bulk density measurement was made on all specimens at about the same time and by the same method, thus eliminating experimental error that might arise from slightly different test and ambient conditions. The bulk density data below illustrate the superiority of the molding composition of this invention.

Specimen: Bulk density (g./ml.)
    Molding resin+ethylenebispelargonamide __ 0.633
    Molding resin+methylenebisstearamide _____ 0.615
    Molding resin+ethylenebisstearamide _____ 0.620
    Tumbled molding resin without lubricant ___ 0.574

While the above bulk density differences of the coated resins do not appear greatly divergent they are especially significant when based on the uncoated resin and then compared to one another. The lubricant efficiency is defined as:

$$LE = 100 \times \left[\frac{A-B}{B}\right]$$

where

A = bulk density of lubricated resin.
B = bulk density of unlubricated resin.

Lubricant efficiencies can then be compared to one another for evaluation by using a lubricant efficiency ratio which is defined as:

$$\text{Lubricant efficiency ratio} = \left[\frac{LE_p}{LE_s} - 1\right] \times 100$$

where $LE_p$ = lubricant efficiency of ethylenebispelargonamide.
$LE_s$ = lubricant efficiency of ethylenebisstearamide.

$$\text{Lubricant efficiency ratio} = 100 \left[\frac{\frac{0.633-0.574}{0.574}}{\frac{0.620-0.574}{0.574}} - 1\right]$$

$$\text{Lubricant efficiency ratio} = 100 \times \left[\left(\frac{0.059}{0.046}\right) - 1\right]$$

Lubricant efficiency ratio = 28%.

It can thus be seen that ethylenebispelargonamide is 28% more efficient than ethylenebisstearamide which has the smallest difference in bulk density of any of the lubricants.

EXAMPLE II

One thousand parts of polyhexamethylene adipamide were blended with 0.2 part of ethylenebispelargonamide (0.02 weight percent). This mixture was tumbled continuously in a suitable container for about two hours.

Similarly, the same resin was treated with the same weight percent of methylenebisstearamide and of ethylenebisstearamide and both samples were tumbled for about two hours. In addition, a resin sample without lubricant was tumbled for about two hours in the same manner. The last three samples were prepared to serve as controls to be compared to the molding composition of this invention. After the samples were prepared a bulk density measurement was made on all specimens at about the same time and by the same method, thus eliminating experimental error that might arise from slightly different test and ambient conditions. The bulk density data below illustrate the superiority of the molding composition of this invention.

| Specimen: | Bulk density (g./ml.) |
|---|---|
| Molding resin+ethylenebispelargonamide | 0.630 |
| Molding resin+methylenebisstearamide | 0.603 |
| Molding resin+ethylenebisstearamide | 0.617 |
| Tumbled resin without lubricant | 0.574 |

$$\text{Lubricant efficiency ratio} = \left[\frac{LE_p}{LE_s} - 1\right] \times 100$$

$$\text{Lubricant efficiency ratio} = \left[\frac{\frac{0.630-0.574}{0.574}}{\frac{0.617-0.574}{0.574}} - 1\right] \times 100$$

$$\text{Lubricant efficiency ratio} = \left[\frac{0.056}{0.043} - 1\right] \times 100$$

Lubricant efficiency ratio = 30%

Here again the molding composition of this invention has significantly higher bulk density and a 30% lubricant efficiency ratio as shown by the above calculation and results in superior production efficiency.

What is claimed is:

1. Polyamide molding particles suitable for injection molding, wherein the polyamide contains recurring carbonamide linkages as an integral part of the polymer chain, said particles being coated with 0.005% to 0.2%, based on the weight of the polyamide, of ethylenebispelargonamide.

2. The composition of claim 1 wherein the particles are coated with 0.01% to 0.02%, based on the weight of the polyamide, of ethylenebispelargonamide.

3. The composition of claim 1 wherein the polyamide is polyhexamethyleneadipamide.

References Cited

UNITED STATES PATENTS 2,948,698  8/1960  Cocci _____ 260—32.6

MORRIS LIEBMAN, Primary Examiner

RICHARD ZAITLEN, Assistant Examiner

U.S. Cl. X.R.

117—100